United States Patent
Cheng

(10) Patent No.: US 6,473,723 B1
(45) Date of Patent: Oct. 29, 2002

(54) MIMIC HIGH PASS FILTER IN A PROTECTIVE RELAY

(75) Inventor: Louis Chi Hoi Cheng, Toronto (CA)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/268,712

(22) Filed: Mar. 17, 1999

(51) Int. Cl.⁷ .............................. G01R 23/14; H03F 1/26
(52) U.S. Cl. .................... 702/190; 84/454; 323/207; 324/76.23; 324/418; 700/41; 700/294
(58) Field of Search ................ 702/59, 60, 69, 702/70, 71, 189, 190, 191; 324/620, 522, 76.23, 418; 700/294, 41; 323/207; 330/110; 84/454

(56) References Cited

U.S. PATENT DOCUMENTS

| | | | |
|---|---|---|---|
| 4,300,182 A | * 11/1981 | Schweitzer, III | 361/79 |
| 4,577,279 A | 3/1986 | Salowe | 702/59 |
| 4,689,570 A | * 8/1987 | Ohgaki et al. | 324/418 |
| 5,070,754 A | * 12/1991 | Adamson | 84/454 |
| 5,302,911 A | * 4/1994 | Miyashita | 330/110 |
| 5,436,556 A | * 6/1995 | Komninos | 324/76.23 |
| 5,455,776 A | 10/1995 | Novosel | 702/59 |
| 5,493,228 A | 2/1996 | Eriksson et al. | 324/522 |
| 5,506,768 A | * 4/1996 | Seem et al. | 700/41 |
| 5,796,630 A | 8/1998 | Maeda et al. | 364/492 |
| 5,798,932 A | 8/1998 | Premerlani et al. | 702/59 |
| 5,751,138 A | * 12/1998 | Venkata et al. | 323/207 |
| 6,173,216 B1 | * 1/2001 | Vu et al. | 700/294 |
| 6,185,508 B1 | * 2/2001 | Van Voorn et al. | 702/60 |

FOREIGN PATENT DOCUMENTS

WO  WO200055952  * 9/2000 .................. 702/190

OTHER PUBLICATIONS

Patent Abstracts of Japan, vol. 15, No. 434 (E–1129), Nov. 6, 1991 & JP 3181212 A (RICOH CO LTD) Aug. 7, 1991, Abstract.

* cited by examiner

Primary Examiner—John S. Hilten
Assistant Examiner—John Le
(74) Attorney, Agent, or Firm—Karl Vick, Esq.; Robin C. Clark, Esq.; Hunton & Williams

(57) ABSTRACT

A mimic filter which can be implemented in analog or digital circuitry, and which removes dc offset or other noise from an input signal using a pseudo-differentiation technique. The input signal is adjusted by a feedback value, and the adjusted signal is amplified by a proportional gain factor to generate an output signal. The feedback value is determined by integrating the output signal and multiplying the integration by an integration gain factor. The mimic filter avoids the generation of false signal spikes.

19 Claims, 4 Drawing Sheets

Magnitude Respond (Mimic Filter)

Phase Respond (Mimic Filter)

Magnitude Respond (New Mimic Filter)

Phase Respond (New Mimic Filter)

MIMIC HIGH PASS FILTER IN A PROTECTIVE RELAY

BACKGROUND OF THE INVENTION

When monitoring a power system to detect system faults, protection equipment is typically configured to perform a number of diagnostic, or monitoring, routines. One such routine includes determining whether the fundamental current frequency components are within an acceptable range or envelope. More specifically, the protection equipment is configured to periodically determine the fundamental power system frequency component of power system current signals for each phase. Once the current signal fundamental frequency component is determined for each phase, each component is compared to a preselected desired envelope. If the determined fundamental component is within envelope, then the subject diagnostic test is passed. If, however, the fundamental component is not within the envelope, such condition may be indicative of a potential fault or other problem. If such a condition persists, the protection equipment may operate to open the circuit associated with the out-of-range component. Once the circuit is opened, a utility worker typically must locate and correct the root cause of the out-of-range current component, and then close the circuit-breaking mechanism in the protection equipment.

In order to identify accurately the location of a fault, for example, the fundamental current component is analyzed to determine the distance from the protection equipment to the fault. In performing such analysis, it is desirable to remove decaying offsets from the current signal fundamental power system frequency component to improve accuracy. Decaying offsets usually occur in line currents during power system transients and are caused by the response of inductive and resistive impedances in the line. The correction for such decaying offset must compensate for the time varying nature of the offset. Once the decaying offset has been removed, the current signal fundamental frequency component can be analyzed to facilitate locating the fault.

Mimic circuits and filters are known which mathematically model transmission line behavior according to the function $IZ(t)=i(t)\cdot R+v(t)$, where $v(t)=L(di(t)/dt)$. This output signal is the sum of two terms: the first term proportional to the product of the mimic resistance and the line current, and the second term proportional to the product of the mimic inductance and the time derivative of the line current. The function above is generally used to remove decaying offsets. Generally, a discrete Fourier transform (DFT) is used to determine the fundamental power system frequency component and harmonics of each line current.

The mimic technique has limitations. For example, the differentiation of the input signal amplifies high frequency harmonics, particularly in industrial devices such as motor drives and cycloconverters. The amplification of these high frequency harmonics can result in false current spikes, which can cause the protective relay to trip at an incorrect time. This problem has become more troublesome as the speed of protection equipment has increased.

In a digital implementation, mimic filters typically rely on the differentiation of two input samples. In order to compensate for a false signal spike, the differential gains are reduced by increasing the sampling period. However, the increase in the sampling period tends to decrease the bandwidth of the filter.

Other techniques are known. For example, to reduce the number of computations required to perform offset correction, U.S. Pat. No. 5,798,932 discloses the separation of fault detection and determination of fault location. More specifically, this patent recognizes that the decaying offsets do not necessarily have to be removed from the current phasors in order to determine whether a fault exists, and that the decaying offsets need only be removed when using the phasors to locate the fault. By reversing the order of process steps executed so that phasor values are generated and then, when needed, removing decaying offsets from the generated phasor values, the computational burden can be significantly reduced in certain applications.

U.S. Pat. No. 5,796,630 discloses a protective relay system intended in part to remove the influence of harmonic components that may be present in a fault current. The system includes a digital filter for outputting first and second difference electric variable data indicative of first and second differences between at least two sample data of first and second electric variables. The system also includes an addition filter for outputting first and second additive electric variable data indicative of orthogonal vector data with respect to the first and second difference electric variable data. The system further includes a relay control unit for calculating controlled variables of a relay operation in the power system on the basis of the first and second difference electric variable data at a certain sampling time, so as to determine whether or not protection of the power system should be carried out.

U.S. Pat. No. 4,577,279 discloses a method and apparatus for providing offset compenstation. The effects of a transient exponential noise signal are removed by sampling a sinusoidal signal, averaging the transient over a time interval corresponding to a number of cycles of the sinusoidal signal, and subtracting the average from the sample at the midpoint of the time interval.

While these and other techniques for dealing with offsets are known, none adequately provides a fast, reliable, and precise technique for filtering noise from power system signals supplied to protective relays while avoiding false signal spikes.

SUMMARY OF THE INVENTION

In view of the above discussion, it would be desirable to provide a reliable, fast, and precise technique for filtering power system signals. It would further be desirable for such a technique to avoid false signal spikes. It would still further be desirable for such a technique to be tunable for different applications, and for such a technique to be realizable in analog or digital circuits.

The present invention addresses the above concerns, and achieves additional advantages, by providing for a filtering technique which, according to exemplary embodiments, replaces the differentiation of a conventional mimic filter with a pseudo-differentiation to suppress low frequency signals. According to one example, the pseudo-differentiator consists of a forward gain Kp and an integrator in a feedback loop. Thus, according to an exemplary method of the present invention, the input electrical signal is received, adjusted by (e.g., reduced by) a feedback value, and amplified to provide an output signal. Noise is removed from the input signal based on the output signal. The feedback value is determined by integrating the output signal.

The present invention thus provides a fast, reliable and precise technique for filtering noise while avoiding false signal spikes.

BRIEF DESCRIPTION OF THE DRAWINGS

The present invention can be more fully understood upon reading the following Detailed Description in conjunction with the accompanying drawings, in which.

DETAILED DESCRIPTION

Figure 1:
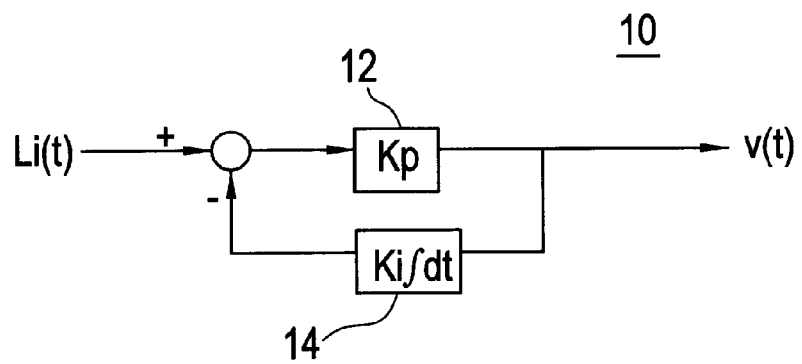
FIG. 1 is a block diagram of a pseudo-differentiator according to one embodiment of the present invention.

Referring now to FIG. 1, a block diagram of a pseudo-differentiator 10 according to one embodiment of the present invention is shown. In this example, the pseudo-differentiator 10 is incorporated into a filter contained in, or otherwise operatively associated with, a protective relay. A signal $L \cdot i(t)$ represents a current in a line associated with a protective relay which is multiplied by an inductance L associated with the line. From this input, a feedback value, generated by a feedback loop to be discussed below, is subtracted to generate a modified input signal. The modified input signal is fed to an amplifier 10 having a proportional gain value $K_p$, where the modified input signal is amplified by the value $K_p$, and the amplified value is output as a signal v(t). This signal v(t) is used in the traditional model equation $IZ(t)=i(t) \cdot R+v(t)$, and the offset value can be compensated using conventional techniques. The feedback loop mentioned above involves providing the amplified signal to an integrator 14, where the amplified signal is integrated over time, and the integration is multiplied by an integral gain value $K_i$. The integrated and multiplied signal is then subtracted from the input signal $L \cdot i(t)$.

When implemented in a filter, the pseudo-differentiator replaces the differentiator of the traditional modeling equation $IZ(t)=i(t) \cdot R+v(t)$ (where v(t) is traditionally equated with $L(di(t)/dt)$. Thus, the modeling equation using the pseudo-differentiator of FIG. 1 becomes:

$$IZ(t)=i(t) \cdot R+[K_p \cdot L/(1+K_p \cdot K_i \int IZ(t)dt)] \cdot i(t),$$

where $K_p$ is the proportional gain and $K_i$ is the integral gain. This mathematical model can be implemented in an analog circuit using resistors, capacitors, and other suitable components, one example of which will be described below. The component values can be selected to adjust the proportional and integral gain values.

According to one aspect of the invention, this equation can be realized using digital circuits, or a suitably programmed processor, by transforming the equation into the discrete time domain using, for example, the trapezoidal method. Using this approach, the equation of a digital signal processor (DSP)-based mimic filter becomes:

$$I_{mimic}(t)=A \cdot i(t)+B \cdot (t-T)+K_x \cdot I_{mimic}(t-T),$$

Where $K_x=[2-K_p K_i T]/[2+K_p K_i T]$, $A=R+L \cdot 2 \cdot K_p/[2+K_p K_i T]$, $B=K_x \cdot R-L \cdot [2K_p/(2+K_p K_i T)]$, and T is a sampling period.

The coefficients A and B take into account the differentiation gain of the filtering. It should be appreciated that increasing the proportional gain Kp can increase the differentiation gain and provide faster filtering response. However, large proportional gain can also produce overshoot and ringing at the filter output. The integral gain Ki can be adjusted to control damping. Increasing the integral gain can suppress the ringing and false signal spike transients, but can increase the steady state response time of the filter. Thus, the mimic filter can be adjusted or tuned to optimize the performance and steady-state response time for different applications. The exemplary mimic filter can thus provide fast and precise filtering of signals to suppress dc offset or other noise while preventing the occurrence of false signal spikes. Preferably, Kp is a value which is less than 0.1 times the filter cutoff frequency, and Ki is less than 40% of Kp.

Figure 2:
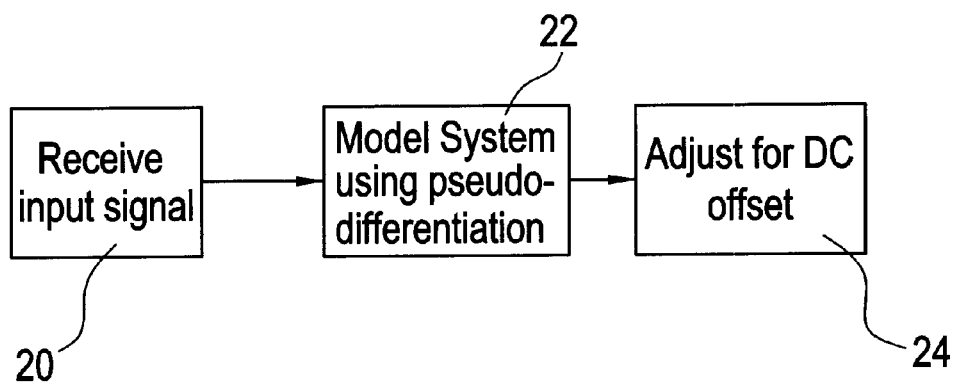
FIG. 2 is a flow chart describing a method of filtering a signal according to an embodiment of the present invention.

Referring now to FIG. 2, a flow chart describing a method for filtering an input signal according to an embodiment of the present invention is shown. The method starts in step 20, where the input signal is received by the filter. In step 22, the power system behavior is modeled, according to the equation $IZ(t)=I(t) \cdot R+v(t)$, where v(t) is generated according to the pseudo-differentiator described with respect to FIG. 1. The pseudo-differentiator can be implemented in an analog circuit, such as in the example of FIG. 3, or using a digital signal processor to generate the appropriate functions set forth above. In step 24, compensation or removal of dc offset or other noise is performed according to known techniques.

Figure 3:
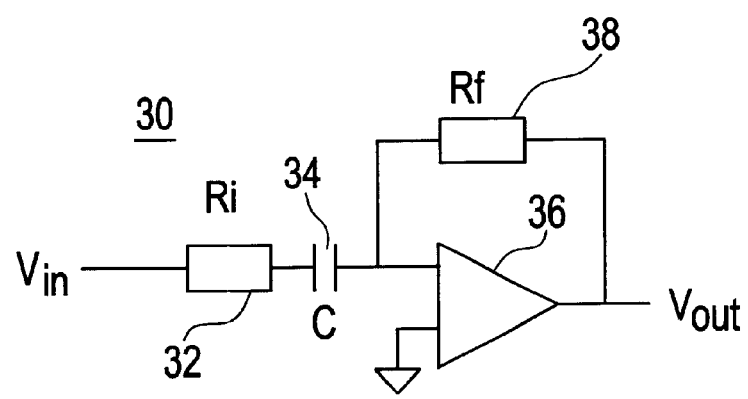
FIG. 3 is a diagram of an analog circuit suitable for implementing a mimic filter according to the present invention.

Referring now to FIG. 3, an exemplary analog implementation of a mimic filter circuit according to the present invention is shown. The circuit 30 receives an input signal Vin and applies this signal to an input resistance 32 (Ri) and to the first terminal of an input capacitance 34 (C). The second terminal of the input capacitance C is connected to the first input of an operational amplifier 36 whose second input is connected to ground, The operational amplifier 36 generates an output signal Vout, and this output signal is fed back into the first input of the operational amplifier 36 via a feedback resistance 38 (Rf). In this example, $T(j\omega)=V_{out}(j\omega)/V_{in}(j\omega)=[j\omega \cdot Rf/Ri]/[j\omega+1/(C \cdot Ri)]$. In this example, $Kp=Rf/Ri$, $Ki \cdot Kp=1/C \cdot Ri$, and therefore $Ki=1/C \cdot Rf$. Also, it should be appreciated that j indicates the frequency domain.

Figure 4A:
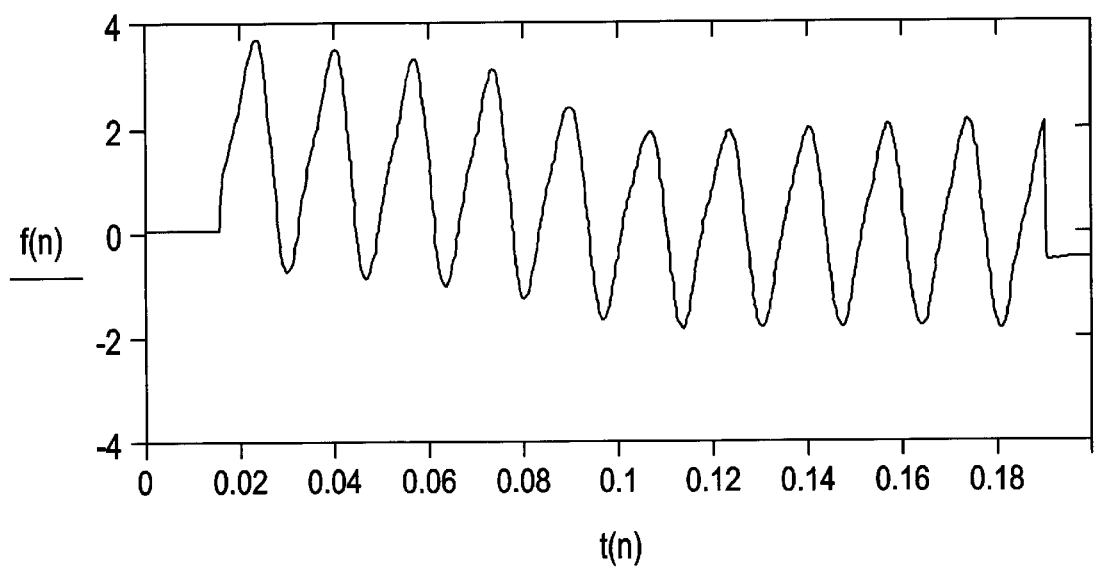
FIGS. 4A–B are waveform plots of an input signal, and an output response comparison of a conventional mimic filter and an exemplary mimic filter according to the present invention, respectively.
Figure 4B:
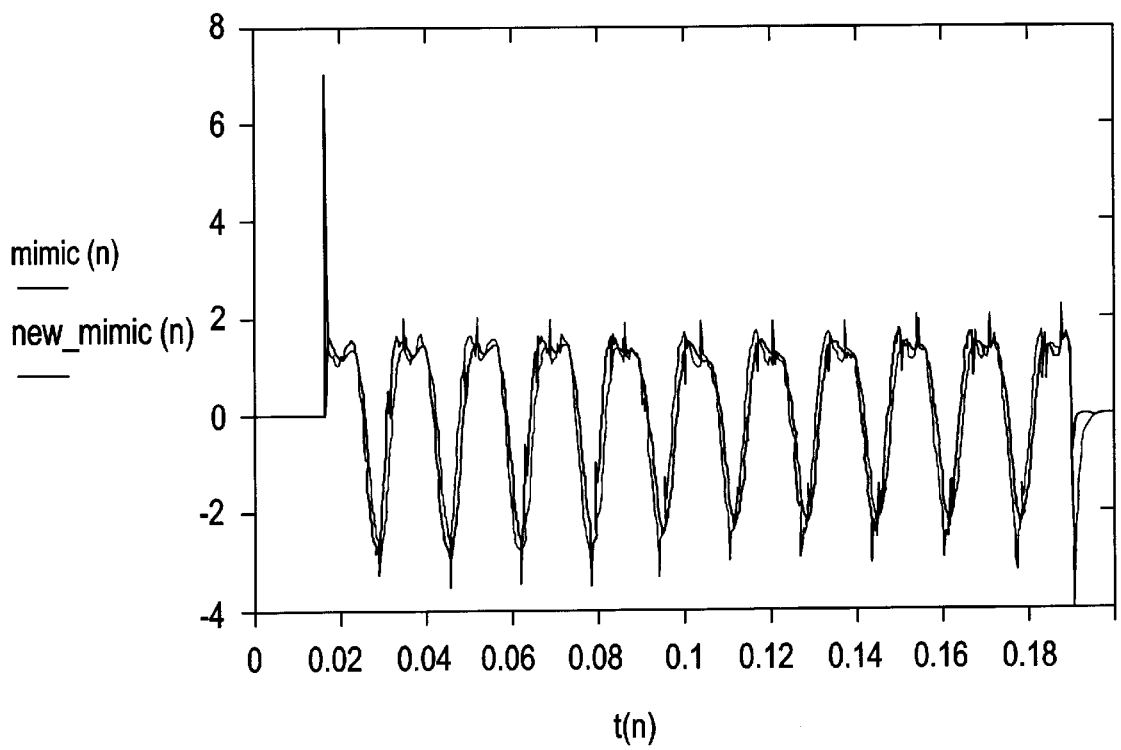

Referring now to FIGS. 4A–B, FIG. 4A is a graphical representation of an input signal, such as a current signal representative of the line current through a portion of a power system protected by a relay. The signal of FIG. 4A has a decaying dc offset. FIG. 4B shows two waveforms, one which is the output of a conventional mimic filter receiving the input signal of FIG. 4A, and the other of which is a mimic filter incorporating the technique of the present invention. In this example, Kp has been selected as 0.995, and Ki has been selected as 0.4. As can be clearly seen in FIG. 4B, the conventional mimic filter ("mimic") outputs a voltage spike, whereas the improved mimic filter of the present invention ("new mimic") does not generate such a spike.

Figure 5A:
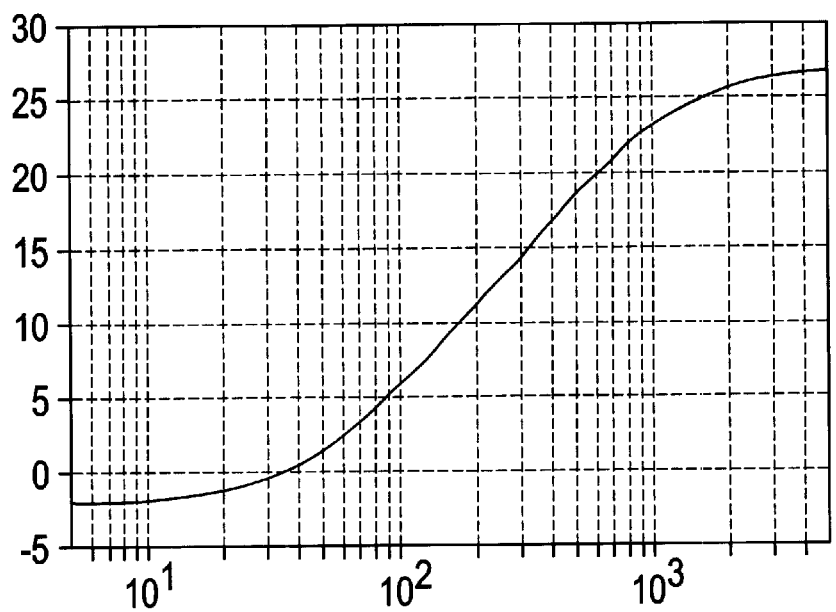
FIGS. 5A–B are bode plots showing magnitude and phase response, respectively, of a conventional mimic filter.
Figure 5B:
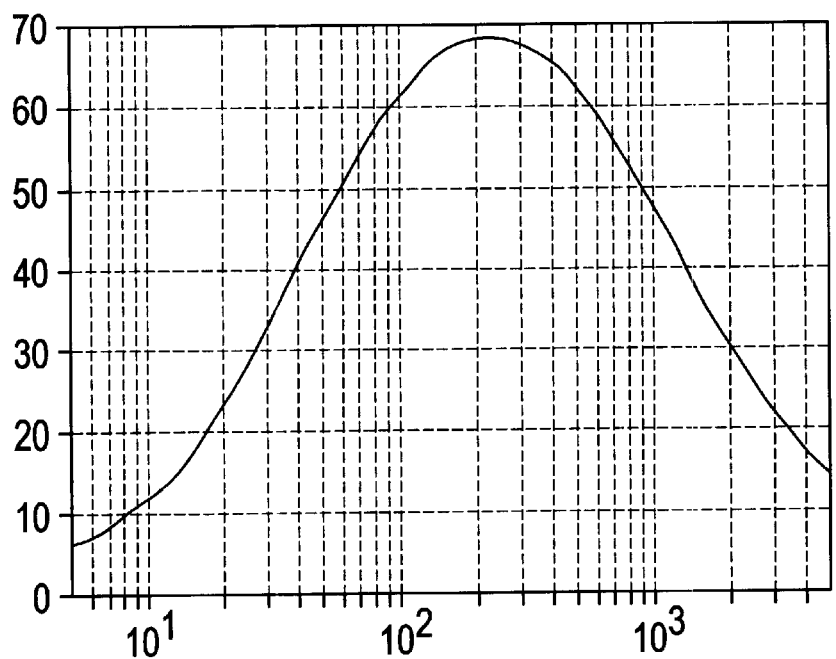
Figure 6A:
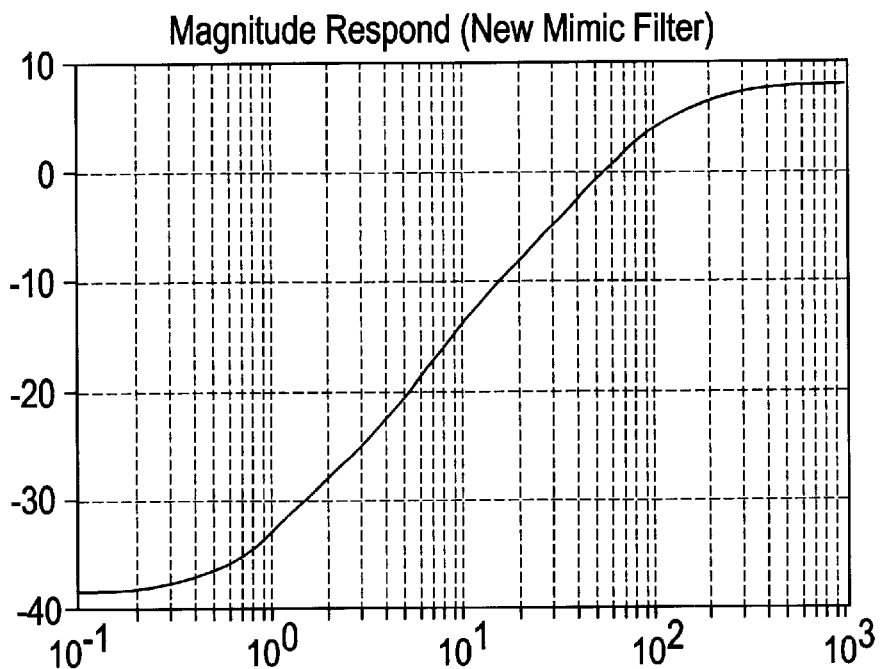
FIGS. 6A–B are bode plots showing magnitude and phase response, respectively, of an exemplary mimic filter according to the present invention.
Figure 6B:
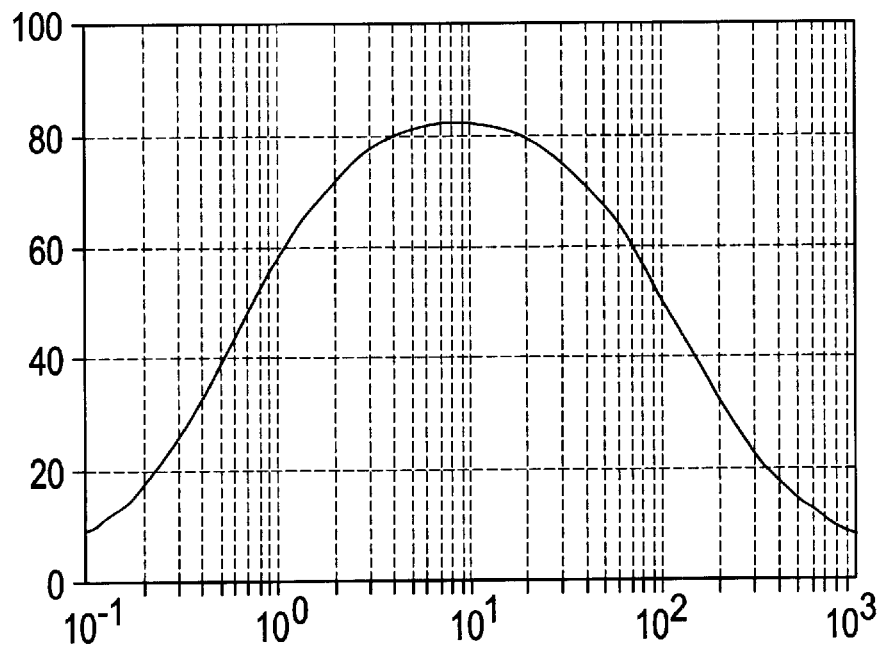

Referring now to FIGS. 5A–B, bode plots of the magnitude and phase response, respectively, of a conventional mimic filter are shown. FIGS. 6A–B show corresponding bode plots of the magnitude and phase response, respectively, of a mimic filter according to the present invention. It can be seen from FIGS. 5A–B that the mimic filter amplifies high frequency components as high as 30 dB, and it can be seen from FIGS. 6A–B that the mimic filter according to the present invention suppresses low frequency and has a gain approximating unity for high frequency components. These waveforms are one way of providing a clear indication of the improved performance of a mimic filter according to the present invention.

While the foregoing description includes numerous details and specificities, these are provided for purposes of explanation only, and are not limitations of the invention. The scope of the invention is broad enough to cover all of the many modifications that can be made to the examples described above which are encompassed by the following claims and their legal equivalents.

What is claimed is:

1. A method for filtering an electrical signal representative of a power system parameter, comprising the steps of:

receiving an input electrical signal;

adjusting the input electrical signal by a feedback value;

amplifying the adjusted electrical signal by a proportional gain value;

outputting the amplified signal as an output signal; and removing noise from the input electrical signal based on the output signal, wherein the feedback value is determined by integrating the output signal.

2. The method of claim 1, wherein the input signal is a current signal representative of current in a power system.

3. The method of claim 2, wherein the output signal is a voltage signal.

4. The method of claim 2, wherein the feedback value is multiplied by an integral gain value.

5. The method of claim 4, wherein the step of removing noise is performed by calculating $IZ(t)=i(t)\cdot R+\{K_p\cdot L/(1+K_p\cdot K_i\int IZ(t)dt)\}\cdot i(t)$, where $IZ(t)$ represents transmission line behavior, $i(t)$ is the input signal, R is a resistance associated with the power system, L is an inductance associated with the power system, $K_p$ is the proportional gain value and $K_i$ is the integral gain value.

6. The method of claim 4, wherein the step of removing noise is performed by calculating the following expression:

$$I_{mimic}(t)=A\cdot i(t)+B\cdot i(t-T)+K_x\cdot I_{mimic}(t-T),$$

where $I_{mimic}(t)$ represents a mimic filter output, $i(t)$ is the input signal, $K_x$ is a proportional value represented by the expression:

$$K_x=\{2-K_pK_iT\}/\{2+K_pK_iT\},$$

where $K_p$ is the proportional gain value, $K_i$ is the integral gain value, and T is a sampling period, A is a first differentiation gain coefficient represented by the expression:

$$A=R+L\cdot 2K_p/\{2+K_pK_iT\},$$

where

R is a line resistance value and L is a line inductance value, and

B is a second differentiation gain coefficient represented by the expression:

$$B=K_x\cdot R-L\cdot\{2K_p/(2+K_pK_iT)\}.$$

7. The method of claim 2, wherein the step of adjusting is performed by subtracting the feedback value from the input signal.

8. The method of claim 2, wherein the proportional gain value is less than approximately 0.1 times a cutoff frequency of the filter.

9. The method of claim 2, wherein the integral gain is less than approximately 40% of the proportional gain value.

10. The method of claim 1, wherein the input signal is multiplied by an inductance factor prior to the step of adjusting.

11. A filter for filtering an input signal representative of a power system, comprising:

an input for receiving the input signal representative of the power system;

means for adjusting the input signal by a feedback value;

an amplifier for amplifying the adjusted input signal by a proportional gain value, and outputting the result as an output signal; and an integrator for integrating the output signal to generate the feedback value.

12. The filter of claim 11, wherein the filter is contained in a protective relay.

13. The filter of claim 11, wherein the input signal is a current signal representative of a current in the power system.

14. The filter of claim 11, wherein the integrator multiplies the feedback value by an integral gain value.

15. The filter of claim 14, wherein the integral gain value is less than approximately 40% of the proportional gain value.

16. The filter of claim 14, further comprising means for generating $IZ(t)=i(t)\cdot R+\{K_p\cdot L/(1+K_p\cdot K_i\int IZ(t)dt)\}\cdot i(t)$, where $IZ(t)$ represents transmission line behavior, $i(t)$ is the input signal, R is a resistance associated with the power system, L is an inductance associated with the power system, $K_p$ is the proportional gain value and $K_i$ is the integral gain value.

17. The filter of claim 14, further comprising means for generating a function having the following expression:

$$I_{mimic}(t)=A\cdot i(t)+B\cdot i(t-T)+K_x\cdot I_{mimic}(t-T),$$

where $I_{mimic}(t)$ represents a mimic filter output, $i(t)$ is the input signal, $K_x$ is a proportional value represented by the expression:

$$K_x=\{2-K_pK_iT\}/\{2+K_pK_iT\},$$

where $K_p$ is the proportional gain value, $K_i$ is the integral gain value, and T is a sampling period, A is a first differentiation gain coefficient represented by the expression:

$$A=R+L\cdot 2\cdot K_p/\{2+K_pK_iT\},$$

where

R is a resistance associated with the power system, L is an inductance associated with the power system, and B is a second differentiation gain coefficient represented by the expression:

$$B=K_x\cdot R-L\cdot\{2K_p-(2+K_pK_iT)\}.$$

18. The filter of claim 1, wherein the proportional gain value is less than approximately 0.1 times a filter cutoff value.

19. The filter of claim 11, wherein the input signal is multiplied by an inductance factor prior to being provided to the adjusting means.

* * * * *